United States Patent
Iyer et al.

(10) Patent No.: US 7,027,460 B2
(45) Date of Patent: Apr. 11, 2006

(54) METHOD AND SYSTEM FOR CUSTOMIZED TELEVISION VIEWING USING A PEER-TO-PEER NETWORK

(75) Inventors: Ravishankar R. Iyer, Hillsboro, OR (US); Ajay Garg, Hillsboro, OR (US); Vijay Tewari, Portland, OR (US); Krishna Kant, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 937 days.

(21) Appl. No.: 10/024,042

(22) Filed: Dec. 21, 2001

(65) Prior Publication Data

US 2003/0118014 A1    Jun. 26, 2003

(51) Int. Cl.
*H04L 12/54* (2006.01)

(52) U.S. Cl. .................. 370/429; 370/486; 725/105

(58) Field of Classification Search ............... 370/352, 370/328, 428, 429, 486; 705/27; 707/1; 725/37, 74, 105, 135; 709/204; 345/600, 345/745; 455/414.1
See application file for complete search history.

(56) References Cited

U.S. PATENT DOCUMENTS

| | | | |
|---|---|---|---|
| 6,640,241 B1 * | 10/2003 | Ozzie et al. | 709/204 |
| 6,792,615 B1 * | 9/2004 | Rowe et al. | 725/37 |
| 2003/0182266 A1 * | 9/2003 | Stern | 707/1 |

* cited by examiner

Primary Examiner—John Pezzlo
(74) Attorney, Agent, or Firm—Kenyon & Kenyon LLP (57) ABSTRACT

Embodiments of the present invention relate to a network of peer-to-peer communication devices controlled by a central controller. Using respective peer-to-peer communication devices, users can submit customized program schedules to the central controller, for media broadcasts that the users wish to record and view at a later time. The central controller maintains a global schedule of individual user-entered program schedules, and directs the peer-to-peer communication devices to record and re-play the content as requested in the schedules. The requested content may be recorded locally by any peer-to-peer communication device and transmitted upon request to a different peer-to-peer communication device of the network.

23 Claims, 4 Drawing Sheets

METHOD AND SYSTEM FOR CUSTOMIZED TELEVISION VIEWING USING A PEER-TO-PEER NETWORK

FIELD OF THE INVENTION

The invention relates generally to a peer-to-peer communication network, and more particularly to a peer-to-peer communication network which provides for customized television viewing according to a user-specified program schedule.

BACKGROUND OF THE INVENTION

Peer-to-peer communications have become familiar in such applications as file sharing over the Internet and the like. Peer-to-peer communications allow for the direct exchange of information between network users, without necessarily requiring an intermediate server.

Many possible applications of peer-to-peer systems remain to be explored. One possible application is in the area of home entertainment, specifically, in the viewing of television broadcasts. Many television viewers are prevented by their work and personal schedules from watching television programs they enjoy at the time the programs are broadcast. Accordingly, known systems such as programmable VCRs (video cassette recorders) and TV subscription services such as offered by corporations like TiVo®, ReplayTV® and Microsoft Corporation® enable users to select TV broadcasts to record for viewing at a time of their choosing.

These known systems, however, have limitations. The limitations include the number of broadcast channels that can be recorded simultaneously, the space on the storage device used to capture aired media and the need for user intervention to replay the recorded content.

A peer-to-peer application for customized TV viewing offers improvements in storage capacity, simultaneous channel access capacity and other benefits, as described in more detail in the following.

DETAILED DESCRIPTION

Embodiments of the invention may comprise a network of interconnected peer-to-peer communication devices, each connected to a receiver/display device capable of receiving and displaying media broadcasts, and each having a storage capacity (internal or external to the peer-to-peer communication device) for recording aired media. The network of peer-to-peer communication devices may be controlled by a central controller.

The network provides distributed resources that can be applied to provide customized television viewing for network users. These distributed resources can significantly exceed the resources that are typically available to an individual, non-networked user. Under the control of the central controller, any peer-to-peer communication device can be directed to record aired media content requested by a user, and then to transmit the requested content to the user at a specified time for viewing. Thus, the user is not limited to the storage capacity and channel access capacity of, for example, a single VCR or TiVo® unit, but instead has the resources of the entire network at his disposal.

Figure 1:
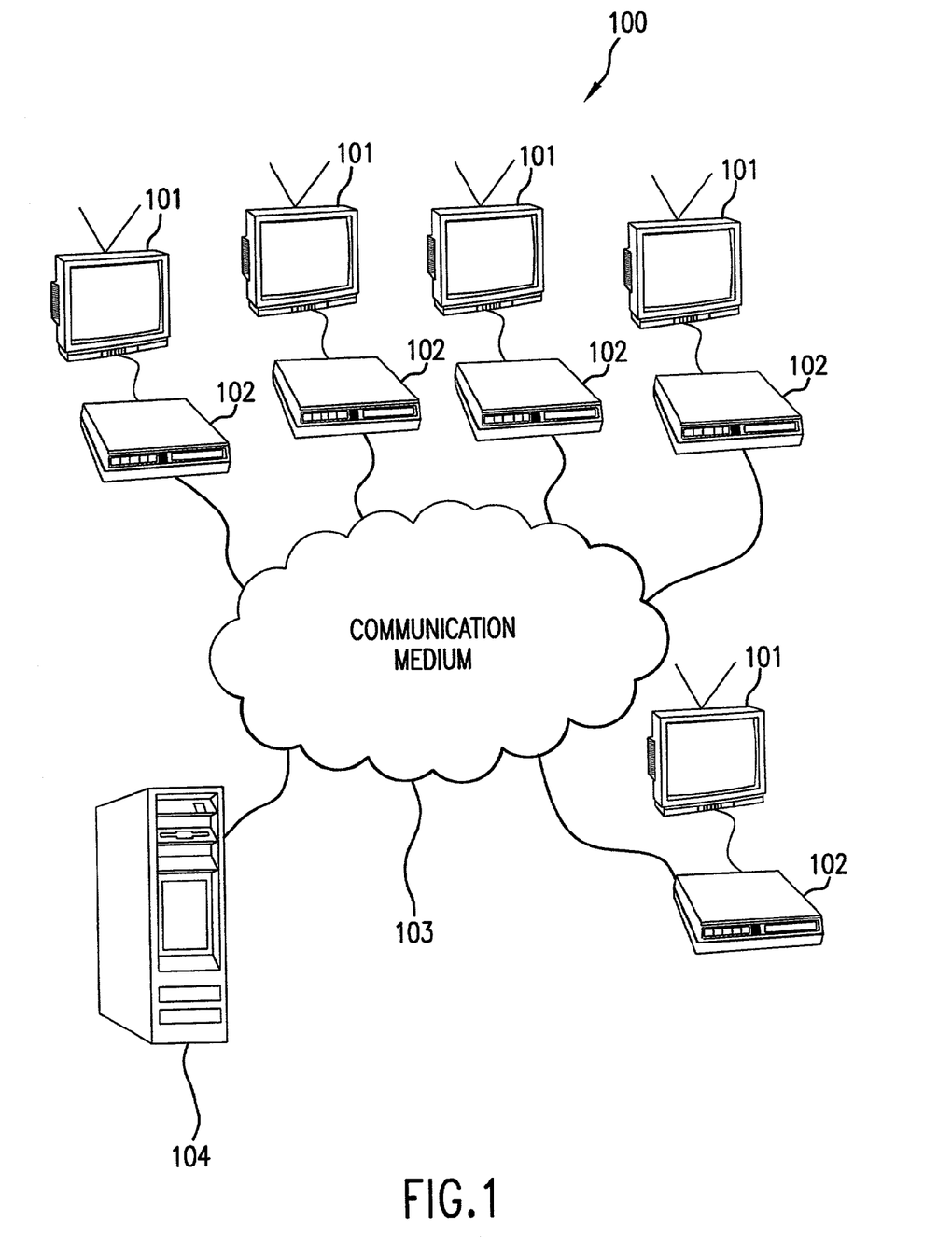
FIG. 1 shows a network of peer-to-peer communication devices according to embodiments of the invention.

FIG. 1 shows one possible configuration of a peer-to-peer network 100 according to embodiments of the invention. Network 100 may include a plurality of peer-to-peer communication devices 102. Peer-to-peer communication devices 102 could be uniquely and directly addressable using a standard naming convention (e.g., IP (Internet protocol) addresses). According to embodiments, peer-to-peer communication devices 102 could be set-top boxes. Network 100 could be configured to support broadband communications.

Each peer-to-peer communication device 102 may be connected via a first I/O port to a receive/display device 101, and via a second I/O port to a communication medium 103. Receive/display device 101 could be a television set, for example. Communication medium 103 could be any suitable medium, e.g., a wired or wireless medium, or a combination of both, for interconnecting peer-to-peer communication devices 102 and enabling communication therebetween. A controller 104 could further be connected via an I/O port to the network 100, to control communication between peer-to-peer communication devices 102.

Each peer-to-peer communication device 102 may contain an internal storage capacity. Each peer-to-peer communication device 102 may further be connected to an external device (not shown) containing a storage medium for storing the recorded content. This overall storage capacity may further be divided into two parts: private and shared. The private storage space is accessible only to the local peer-to-peer communication device. The shared storage space may be accessible to all the other peer-to-peer communication devices 102 via controller 104. As discussed in greater detail below, a given peer-to-peer communication device may record a media broadcast onto its local shared storage medium, or may receive pre-recorded content from another peer-to-peer communication device of network 100.

Peer-to-peer communication devices 102 and controller 104 may be configured to enable a user, typically an individual owner or renter of a peer-to-peer communication device 102 and a receiver/display device 101, to enter a customized program schedule via the peer-to-peer communication device 102. The peer-to-peer communication device 102 may be equipped for this purpose with a programmable user interface operated, for example, by pushing a sequence of buttons on a remote control and responding to prompts. The program schedule may specify, for example, a channel and an air time of at least a portion of a media broadcast that the user wishes to record. The program schedule may, in a like manner, further specify a plurality of broadcasts that the user wishes to record. The program schedule may further specify an order and corresponding times for later viewing of the recorded content. The peer-to-peer communication device 102 may then transmit the program schedule, via network 100, to controller 104. The peer-to-peer communication device 102 also maintains a copy of the program schedule locally.

Peer-to-peer communication devices 102 may go "online" or "offline" to network 100 at randomly-distributed times. When a peer-to-peer communication device is powered on and connected to the network such that it can communicate with other devices or other devices can communicate with it, it is said to be online. When such a device cannot communicate with other devices or other devices cannot communicate with it, the device is said to be offline.

Controller 104 may have functions including maintaining and implementing a global schedule comprising a plurality of program schedules submitted by individual users, based on individual user input at respective peer-to-peer communication devices 102 as described above. To implement the global schedule, controller 104 may direct a peer-to-peer communication device to record at least a portion of a media broadcast specified in an individual customized program schedule. The peer-to-peer communication device that controller 104 directs to record the content specified in the program schedule may not necessarily be the same one that was used to enter the program schedule and submit it to controller 104. Rather, to implement the global schedule, controller 104 may determine according to a set of criteria which peer-to-peer communication device to use, and at what time, to record requested content. Controller 104 may later direct the peer-to-peer communication device that recorded the requested content to transmit it, at the time scheduled for viewing, to the requesting peer-to-peer communication device.

The set of criteria used by controller 104 for determining which peer-to-peer communication device to use for recording may be based on parameters including (1) user priority level, (2) content priority level, (3) number of simultaneous programs to be recorded during a time slot, (4) number of peer-to-peer communication devices available to record at the time that the program content is aired, (5) history of peer-to-peer communication devices available at a scheduled playback time (6) history of popularity of the content and (7) local peer-to-peer communication device availability. The user priority level may be set based on a predetermined agreement between the user and a provider of a customized television service as described herein. The content priority level is determined by each user.

Also among the criteria for making the determination as to which peer-to-peer communication device to use to record requested content, and at what times, is the criterion that transfers of recorded content between peer-to-peer communication devices 102 (i.e., from a recording peer-to-peer communication device to a requesting peer-to-peer communication device) should be minimized. This may be addressed by the last parameter (local peer-to-peer communication device availability) listed above. Application of the various criteria outlined in the foregoing may be formulated as a graph theoretic assignment problem and solved using well-known techniques.

Figure 2:
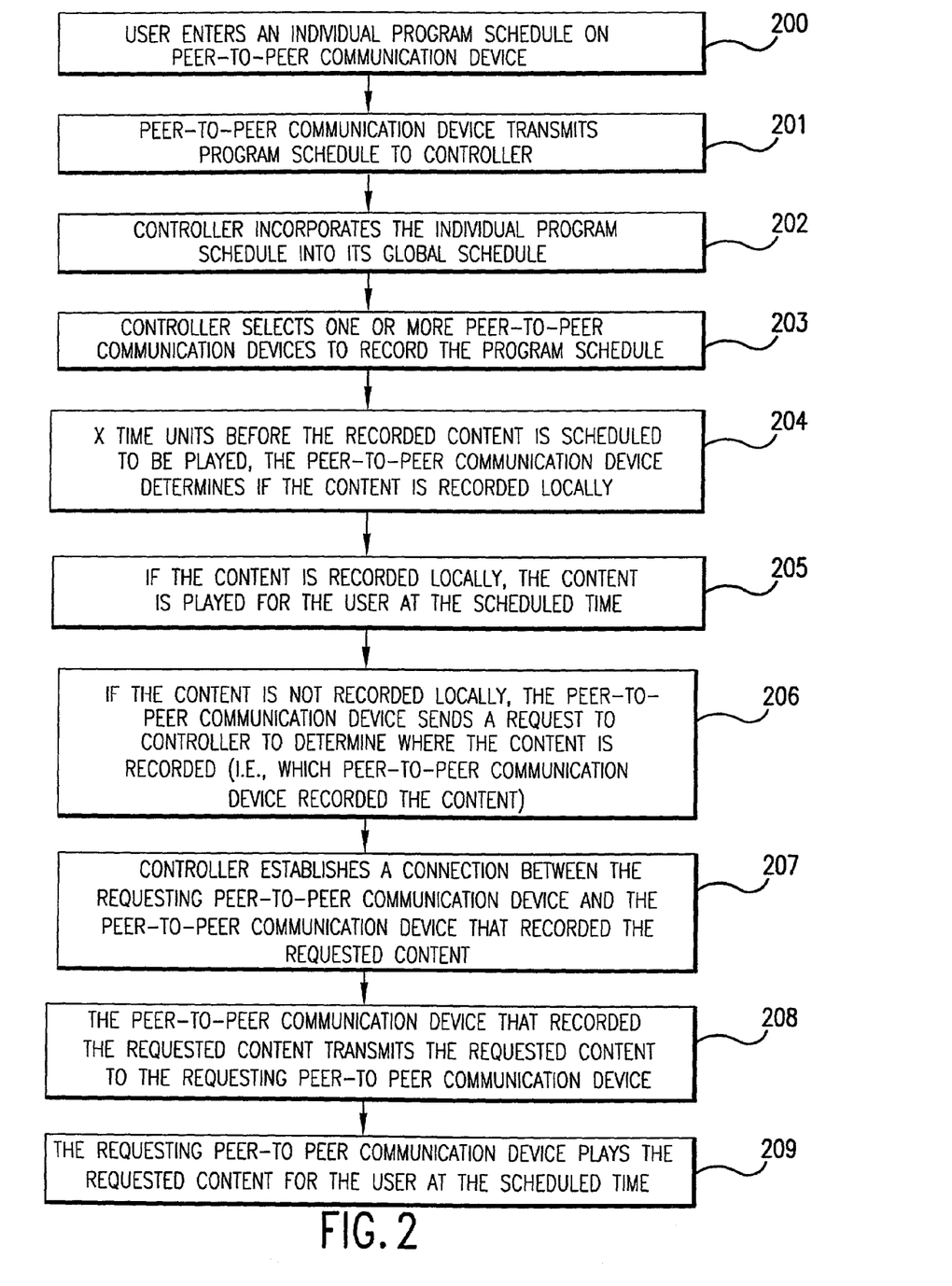
FIG. 2 shows a process flow according to embodiments of the invention.

FIG. 2 shows a flowchart illustrating a process according to the invention. As shown in block 200, a user may enter a customized, individual program schedule of media broadcasts that the user wishes to record and view at a later, specified time in a specified order. The program schedule may be transmitted via network 100 to controller 104, as shown in block 201.

Controller 104 may incorporate the individual program schedule into a global schedule, as shown in block 202. As outlined above, the global schedule may comprise a plurality of program schedules submitted by individual users, based on individual user input at respective peer-to-peer communication devices 102. The global schedule may be reorganized incrementally based on changes or new scheduling requests received at any time from peer-to-peer communication devices 102.

As shown in block 203, controller 104 may select one or more peer-to-peer communication devices 102 to record the content requested in the individual program schedule. The content may be recorded locally, i.e., by the requesting peer-to-peer communication device on a storage device connected locally, or by another peer-to-peer device of the network on its storage medium. Which peer-to-peer communication device is selected to record the requested content may depend on criteria, as outlined above, applied to meet such objectives as minimizing transfers of content between peer-to-peer communication devices needed to satisfy schedule requests.

Sometime before the recorded content is scheduled to be played for a user, the peer-to-peer communication device that was used to submit the program schedule to controller 104 may determine whether the content specified in the program schedule was recorded locally in the private storage space based on a content listing that the device maintains. If so, the content may be played for the user at the scheduled time on the receiver/display device 101 connected to the peer-to-peer communication device, as shown in block 205.

As shown in block 206, if the content is not available locally in the private storage space, the peer-to-peer communication device may send a request to controller 104 for controller 104 to determine where the requested content was recorded. More particularly, controller 104 may search records it maintains that track which peer-to-peer communication device or devices was/were used to record the content specified in a particular individual program schedule.

When controller 104 finds this information, it may coordinate the establishment of a communication channel between a requesting peer-to-peer communication device and the peer-to-peer communication device or devices used to record the requested content, as shown in block 207. After the channel is established, the peer-to-peer communication device or devices used to record the requested content may transmit the content to the requesting peer-to-peer communication device, as shown in block 208.

After the requesting peer-to-peer communication device receives the content, it may play the content for the user at the scheduled time on the receiver/display device 101 connected to the peer-to-peer communication device, as shown in block 209.

Controller 104 may be implemented in the form of a server computer configured with computer executable instructions for causing the functions of controller 104 to be performed. The computer executable instructions may be loaded from an external storage medium into the memory of the computer and fetched and executed by one or more processors of the computer.

Figure 3:
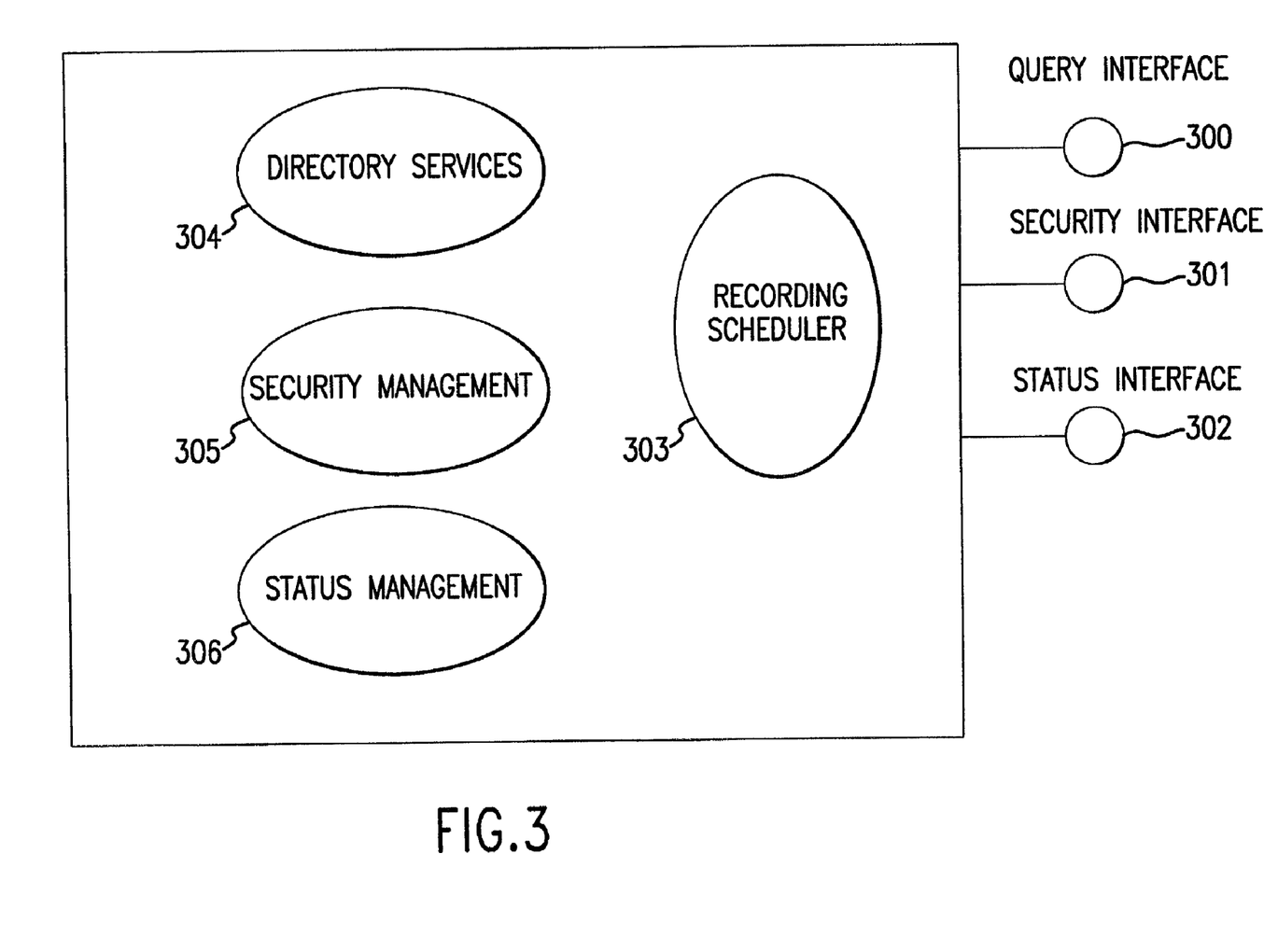
FIG. 3 shows components of a network controller according to embodiments of the invention.

FIG. 3 depicts internal software modules for implementing functions of controller 104. The software includes three interfaces for use by peer-to-peer communication devices 102. A query interface 300 is used by peer-to-peer communication devices 102 to communicate with controller 104 regarding queries pertaining to media content. For instance, when a peer-to-peer communication device 102 is close to its playback time for some content, it may contact query interface 300 to determine where the content is available. Query interface 300 may retrieve this information from a directory services module 304 and relay it back to the peer-to-peer communication device. Query interface 300 may also be used by the peer-to-peer communication device to communicate its schedule to controller 104. Directory services module 304 may then store this schedule.

A recording scheduler 303 may access the schedules of all peer-to-peer communication devices 102 that it is servicing and then execute a decision algorithm which applies criteria as described above to decide which peer-to-peer communication device 102 should record what content and at what time. Recording scheduler 303 may obtain historical statistics of online/offline times for peer-to-peer communication devices 102 and calculate the probability of finding a peer-to-peer communication device online for a time slot during which the requested content must be recorded. It may then attempt to use the peer-to-peer communication devices 102 with the highest probabilities of being online at the assigned time slot first, for recording content at that time slot. Controller 104 may then communicate these decisions to the peer-to-peer communication devices 102 using a control interface of the peer-to-peer communication devices 102, described in greater detail below. Recording scheduler 303 may also maintain a history of unscheduled requests and use this to predict likely unscheduled requests in the future. Based on the above information, recording scheduler 303 may direct peer-to-peer communication devices 102 to record content to satisfy these anticipated unscheduled requests.

A status interface 302 may be used by peer-to-peer communication devices 102 periodically to inform controller 104 about their status. This status may include, among other things, available resources of the peer-to-peer communication devices. A status management module 306 may maintain this data. A periodic call by peer-to-peer communication devices 102 to status interface 302 of controller 104 may be used by status management module 306 of controller 104 to maintain information about which peer-to-peer communication device 102 is currently available for recording content. Status management module 306 may also use the absence of the periodic call from a particular peer-to-peer communication device 102 to mark that peer-to-peer communication device 102 as unavailable for recording or retrieving content. The status interface 302 may also be used by peer-to-peer communication device 102 to inform controller 104 regarding the completion of the recording of content requested earlier by the controller 104.

In case a peer-to-peer communication device 102 makes an unscheduled request for content, recording scheduler 303 in conjunction with directory services module 304 and status management module 306 may determine if the request can be met without reducing the quality of content already being delivered to various peer-to-peer communication devices 102 at that time. This is determined based on such parameters as the amount of available resources and available network bandwidth. If the unscheduled request can be met, controller 104 informs the requesting peer-to-peer communication device 102 of the peer-to-peer communication device 102 (the content owner) to be contacted for this content. The requesting peer-to-peer communication device 102 may then directly contact the owner peer-to-peer communication device 102 for the content. The owner peer-to-peer communication device 102 may provide the content to the requester either as a complete download before replay or stream it to the requester for replay in real time. When media content is not downloaded in its entirety and stored on local media before it is played back to the user, but, rather, played back to the user in real time as the remainder of the media continues to be downloaded, the media is said to be "streamed". Streaming requests (unscheduled or scheduled) may only be honored if adequate resources (computational capacity, buffer space, network bandwidth and the like) are available between the owner and requesting devices.

A security interface 301 may be used by peer-to-peer communication devices 102 to interact with a security management module 305 of controller 104. Security functions provided by security interface 301 and security management module 305 may be based on many well-known schemes and may address the following objectives:

Authentication of peer-to-peer communication devices 102 to controller 104. This may be done to ensure that each peer-to-peer communication device 102 is identified in a unique and non-repudiable manner. This also ensures that communication between peer-to-peer communication devices and controller 104 cannot be spoofed.

Access Control: Access control may be a system component according to embodiments in order to ensure that users are able to watch only those programs that they are authorized to receive from the original content provider (e.g., the cable or satellite TV company to which the user has subscribed). Embodiments of the invention may provide protection in the form of access control to ensure that no peer-to-peer communication device in the network is able to receive or store any TV programs beyond the subscription level of the device owner.

Encryption: This feature could provide for encryption of content on the network subject to performance and need.

Integrity: This would ensure that all communications are tamper resistant.

Figure 4:
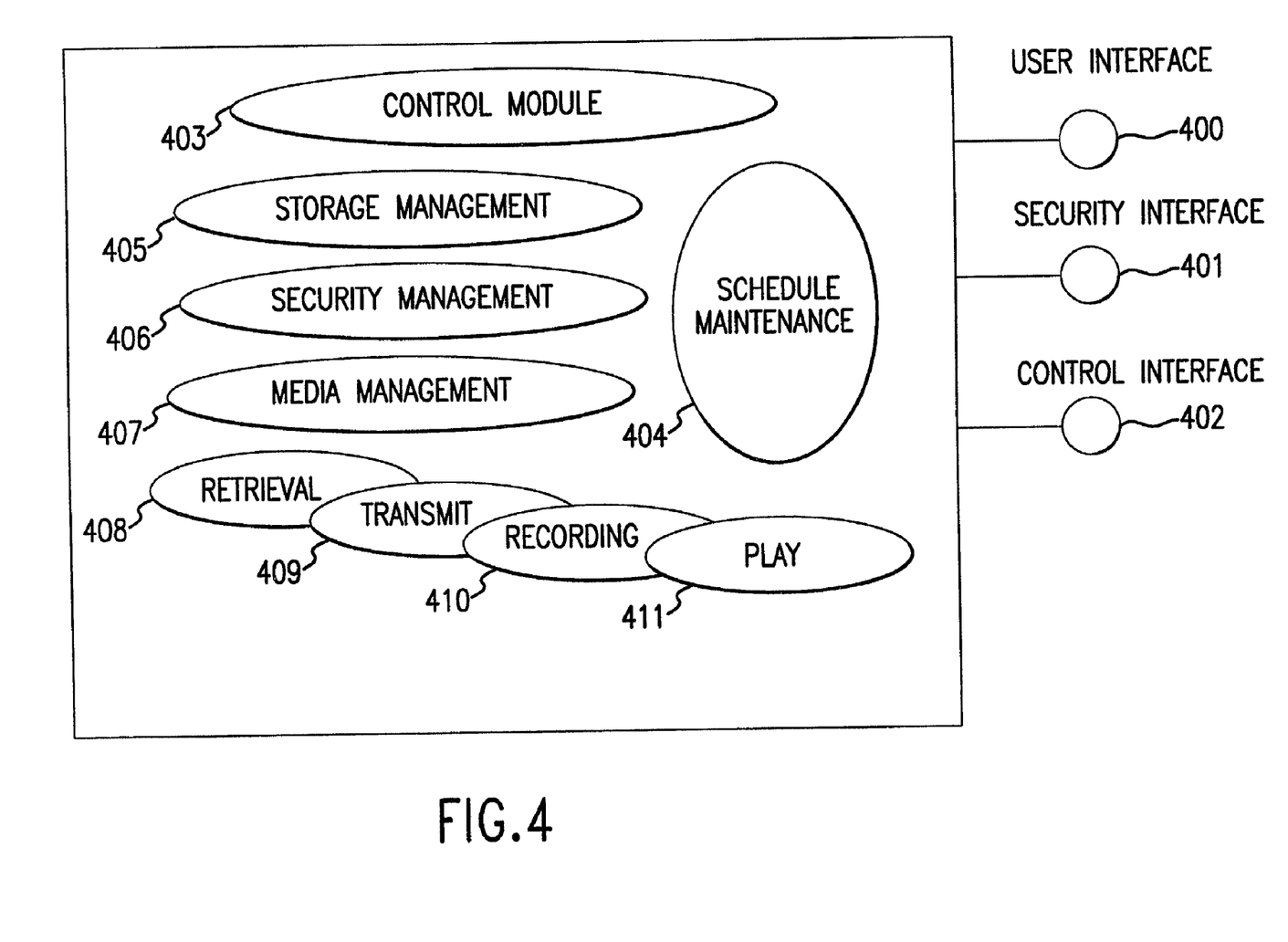
FIG. 4 shows components of a peer-to-peer communication device according to embodiments of the invention.

Each peer-to-peer communication device 102 may contain software programs, which when executed by processing unit(s) of the peer-to-peer communication device perform functions of the device. FIG. 4 depicts internal software modules for implementing functions of a peer-to-peer communication device 102.

A control module 403 may exercise overall control over the activities of a peer-to-peer communication device 102. In addition to performing other tasks, control module 403 may use status interface 302 of controller 104 at periodic intervals to inform it of the peer-to-peer communication device's status. As noted above, status could include, among other things, resource availability (e.g., storage space and the like). An absence of this periodic update could indicate that the peer-to-peer communication device 102 is unavailable to the network.

A storage management module 405 may control and manage all of the local storage (internal/external, private/shared) used by a peer-to-peer communication device 102. A media management module 407 may use this storage appropriately for recording and playback of private or shared content.

The peer-to-peer communication device 102 exposes software interfaces for other devices to interact with it. These include a user interface 400, used by an input device (for example, a remote control or keypad of the device) to enter information such as the program schedule. A schedule maintenance module 404 may store the program schedule locally, and also communicate the program schedule to controller 104 via query interface 300.

A security management module 406 may interact with the corresponding module 305 of controller 104 to ensure security objectives as described above are addressed.

Based on the program schedules that controller 104 receives from peer-to-peer communication devices 102 of the network, controller 104 may assign responsibility of recording the content to various peer-to-peer communication devices 102. Controller 104 may communicate these assigned recording responsibilities to each peer-to-peer communication devices 102 via a control interface 402 of each peer-to-peer communication device 102. Based on these assigned responsibilities, media management module 407 may then direct respective peer-to-peer communication devices 102 to record the assigned content via a recording module 410. Media management module 407 may interact with a storage management module 405 of each device to store the assigned content on the storage of the device.

Based on the program schedule for the user (stored locally by schedule maintenance module 404), media management module 407 may query controller 104 for the location of the content to satisfy the requirements of the schedule. Using information returned by controller 104, media management module 407 may direct a retrieval module 408 to retrieve the content from the various peer-to-peer communication devices 102 of the network.

A play module 411 may use the content retrieved to play the content back to the user at the scheduled time.

A peer-to-peer communication device 102 may also receive requests from other peer-to-peer communication devices 102 to download content that it has recorded on instructions from controller 104. These requests may be directed to media management module 407, which may use a transmit module 409 to send the content to the requesting peer-to-peer communication device 102. Additionally, a peer-to-peer communication device 102 may get requests from controller 104 and other peer-to-peer communication devices 102 to satisfy dynamic requests for streamed content. Transmit module 409 may also be used to satisfy these requests.

Each peer-to-peer communication device 102 may be capable of recording aired media while simultaneously playing pre-recorded content and/or streaming it to another device. In addition, each peer-to-peer communication device 102 may be capable of rewinding, fast-forwarding and searching through locally stored content to locate the desired portion for transmission to another peer-to-peer communication device. As stated above, each peer-to-peer communication device 102 may also accept requests for streaming its local content to another device and real-time playback of the received streaming media.

Controller 104 may use a redundant architecture, for example, using "hot stand-by" components or mirroring the functionality across multiple controllers. A "stand-by" refers to a component or device that can replace a current device (in use) when it fails. A "hot" stand-by refers to a component or device that will be automatically deployed (without the need taking the current device or system offline upon detection of a failure) in order to increase system tolerance to isolated hardware failures. Mirroring refers to the use of multiple controllers that perform each task in synchrony (or in lock step) so that if one fails the other can take over the tasks without resulting in noticeable system failure. Fault tolerance is also provided in that so long as the underlying network infrastructure remains alive, any given peer-to-peer communication device will continue to function normally as other peer-to-peer communication devices fail, go offline or come back online.

It may be appreciated that by providing centralized control of network 100 via controller 104 as described above, the complexity, and consequently the cost, of each peer-to-peer communication device 102 can be reduced.

Some examples of advantageous applications of embodiments of the invention as described in the foregoing include use in controlled community environments such as dormitories, schools, libraries, apartment complexes, retirement homes and the like. It may further be observed that, advantageously, the application is scalable to the size of the community being served.

One important side-effect of establishing a peer-to-peer community infrastructure as described above is that it can easily be extended by building several value added services on top of the content distribution network. For example, it is possible to have value-added communication facilities built on top of the peer-to-peer network. This communication could be users (in different apartments) exchanging comments or notes (e.g.: about scenes from a movie) to each other while watching the same content (like a movie).

As discussed above, aspects of the present invention may be embodied in computer-executable instructions. The instructions may be stored and transported on a computer-usable medium such as diskette, magnetic tape, disk, CD-ROM or the like. The instructions may be downloaded to another storage medium such as a ROM or RAM, from which they may be fetched and executed by a processor to effect the advantageous features of the invention.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A peer-to-peer communication device, comprising:
   a network I/O port connectable to a network;
   a receive/display I/O port connectable to a receive/display device; and
   a component configurable to locally record at least a portion of a media broadcast in accordance with a request, and to transmit said locally recorded portion to another peer-to-peer communication device of said network upon request.

2. The peer-to-peer communication device of claim 1, wherein said component is further configurable to receive a transmission from another peer-to-peer communication device of said network.

3. The peer-to-peer communication device of claim 2, wherein said component is further configurable to locally store said transmission.

4. The peer-to-peer communication device of claim 2, wherein said component is further configurable to play said transmission on said receive/display device after said transmission is stored locally in its entirety or as said transmission is being received.

5. The peer-to-peer communication device of claim 1, wherein said component is further configurable to receive a request to record said portion of a media broadcast as input from a central controller of said network.

6. The peer-to-peer communication device of claim 1, wherein said component is further configurable to locally record a plurality of portions of a media broadcast, and to locate a selected pre-recorded portion for transmission to another peer-to-peer communication device of said network upon request.

7. The peer-to-peer communication device of claim 1, wherein said component is configurable to receive user input specifying a program schedule comprising at least a portion of a media broadcast, and transmit said program schedule to a central controller of said network.

8. A controller comprising:
   an I/O port connectable to a network that includes a plurality of peer-to-peer communication devices; and
   a storage device and a processing unit coupled to said storage device;
   wherein said storage device and processing unit are configurable to:
   receive user input on said I/O port entered on a first peer-to-peer communication device of said network, said user input specifying at least a portion of a media broadcast to be viewed on a receive/display device coupled to said peer-to-peer communication device; and issue a request to a second peer-to-peer communication device to locally record said portion of a media broadcast.

9. The controller of claim 8, wherein said storage device and processing unit are further configurable to cause said second peer-to-peer communication device to transmit said locally recorded portion of a media broadcast to said first peer-to-peer communication device at a time specified by said user input.

10. A controller, comprising:

an I/O port connectable to a network that includes a plurality of peer-to-peer communication devices;

a storage device and a processing unit coupled to said storage device;

wherein said storage device and processing unit are configurable to implement a plurality of user-input program schedules received from a plurality of said peer-to-peer communication devices, each of said program schedules specifying at least a portion of a media broadcast to be viewed on respective receive/display devices coupled to respective peer-to-peer communication devices.

11. The controller of claim 10, wherein to implement said program schedules, said controller issues a request to a first peer-to-peer communication device to record at least a portion of a media broadcast specified in a program schedule entered by a user of a second peer-to-peer communication device different from said first peer-to-peer communication device.

12. The controller of claim 10, wherein said controller is configurable to:

receive a request from a first peer-to-peer communication device for content specified in a program schedule specified by a user of said first peer-to-peer communication device;

determine whether a second peer-to-peer communication device has locally recorded said requested content; and if so, cause said second peer-to-peer device to transmit said requested content to said first peer-to-peer communication device.

13. A computer-usable medium tangibly embodying computer-executable instructions, said instructions when executed implementing a process comprising:

causing a first peer-to-peer communication device to locally record at least a portion of a media broadcast in accordance with user input, and to transmit said locally recorded portion to a second peer-to-peer communication device of said network upon request.

14. The computer-usable medium of claim 13, wherein said process further comprises causing said first peer-to-peer communication device to receive a transmission from said second peer-to-peer communication device.

15. The computer-usable medium of claim 14, wherein said process further comprises causing said first peer-to-peer communication device to locally store said transmission.

16. The computer-usable medium of claim 14, wherein said process further comprises causing said first peer-to-peer communication device to play said transmission on a receive/display device connected thereto, after storing said transmission in its entirety or as said transmission is being received.

17. A computer-usable medium tangibly embodying computer-executable instructions, said instructions when executed causing a controller of a network that includes a plurality of peer-to-peer communication devices to implement a plurality of user-input program schedules received from a plurality of said peer-to-peer communication devices, each of said program schedules specifying at least a portion of a media broadcast to be viewed on respective receive/display devices coupled to respective peer-to-peer communication devices.

18. The computer-usable medium of claim 17, wherein to implement said plurality of user-input program schedules, said controller causes a first peer-to-peer communication device to record at least a portion of a media broadcast specified in a program schedule entered by a user of a second peer-to-peer communication device different from said first peer-to-peer communication device.

19. The computer-usable medium of claim 17, wherein to implement said plurality of user-input program schedules, said instructions cause said controller to:

receive a request from a first peer-to-peer device for content specified in a program schedule specified by a user of said first peer-to-peer device;

determine whether a second peer-to-peer device has locally recorded said requested content; and if so, cause said second peer-to-peer device to transmit said request content to said first peer-to-peer communication device.

20. A system comprising:

a plurality of peer-to-peer communication devices interconnected via a network, and each peer-to-peer communication device further connected to a receive/display device;

a controller connected to said network, to control said plurality of peer-to-peer communication devices in accordance with user-input program schedules, said program schedules respectively specifying at least a portion of a media broadcast to be viewed on respective receive/display devices coupled to respective peer-to-peer communication devices;

wherein said controller is configurable to cause a first peer-to-peer communication device to record at least a portion of a media broadcast specified in a program schedule entered by a user of a second peer-to-peer communication device different from said first peer-to-peer communication device.

21. The system of claim 20, wherein said network controller is further configurable to:

receive a request from a first peer-to-peer device for content specified in a program schedule specified by a user of said first peer-to-peer device;

determine whether a second peer-to-peer device has locally recorded said requested content; and if so, cause said second peer-to-peer device to transmit said request content to said first peer-to-peer communication device.

22. In a network including interconnected peer-to-peer communication devices and a controller of said peer-to-peer communication devices, a method comprising:

receiving, at said controller, user input entered on a first peer-to-peer communication device specifying at least a portion of a media broadcast to be viewed on a receive/display device coupled to said first peer-to-peer communication device;

causing a second peer-to-peer communication device different from said first peer-to-peer communication device to locally record said portion of a media broadcast; and causing said second peer-to-peer communication device to transmit said locally recorded portion of a media broadcast to said first peer-to-peer communication device upon request.

23. The method of claim 22, wherein said controller maintains a plurality of user-input program schedules received from a plurality of said peer-to-peer communication devices, each of said program schedules specifying at least a portion of a media broadcast to be viewed on respective receive/display devices coupled to respective peer-to-peer communication devices.

* * * * *